United States Patent [19]

Guironnet

[11] Patent Number: 4,988,475
[45] Date of Patent: Jan. 29, 1991

[54] DEVICE FOR CHECKING THE AXIAL RETENTION FORCE ON A PERIPHERAL FUEL ROD OF A FUEL ASSEMBLY OF A NUCLEAR REACTOR

[75] Inventor: Louis Guironnet, Lyons, France

[73] Assignees: Framatome, Courbevoie; Cogema, Velizy Villacoublay, both of France

[21] Appl. No.: 458,028

[22] Filed: Dec. 28, 1989

[30] Foreign Application Priority Data

Dec. 28, 1988 [FR] France ................. 88 17344

[51] Int. Cl.⁵ ............................................. G21C 17/06
[52] U.S. Cl. ................................... 376/248; 376/245; 376/258; 73/161
[58] Field of Search ............... 376/245, 248, 258, 261, 376/260; 73/161

[56] References Cited

U.S. PATENT DOCUMENTS

| | | | |
|---|---|---|---|
| 4,246,783 | 1/1981 | Steven et al. | 376/245 |
| 4,265,010 | 5/1981 | Doss et al. | 376/261 |
| 4,575,930 | 3/1986 | Blickenderfer | 376/261 |
| 4,668,466 | 5/1987 | Rylatt | 376/245 |
| 4,683,109 | 7/1987 | Cooper, Jr. et al. | 376/261 |
| 4,696,784 | 9/1987 | Tolino et al. | 376/245 |

FOREIGN PATENT DOCUMENTS

| | | | |
|---|---|---|---|
| 0192406 | 8/1986 | European Pat. Off. | |
| 62-897 | 1/1987 | Japan | 376/261 |

Primary Examiner—Daniel D. Wasil
Attorney, Agent, or Firm—Pollock, Vande Sande & Priddy

[57] ABSTRACT

The device comprises a rod (28) on which is mounted a means (30, 32, 33) for support and displacement which is movable in an axial direction of the rod (28) and in two directions perpendicular to this axial direction. The support (33) of the means for displacement carries a device for pushing axially on a longitudinal end of the pencil, which may be activated by a control means (35), one end of which is located in a control station (25) disposed above a fuel assembly storage pool. Means for measuring the axial pushing force on the pencil and the length of axial displacement of the pencil under the effect of the pushing are disposed in the control station (25). A video camera (34), carried by the support (33), makes it possible to provide an image of a zone in the vicinity of the end of the pencil.

7 Claims, 10 Drawing Sheets

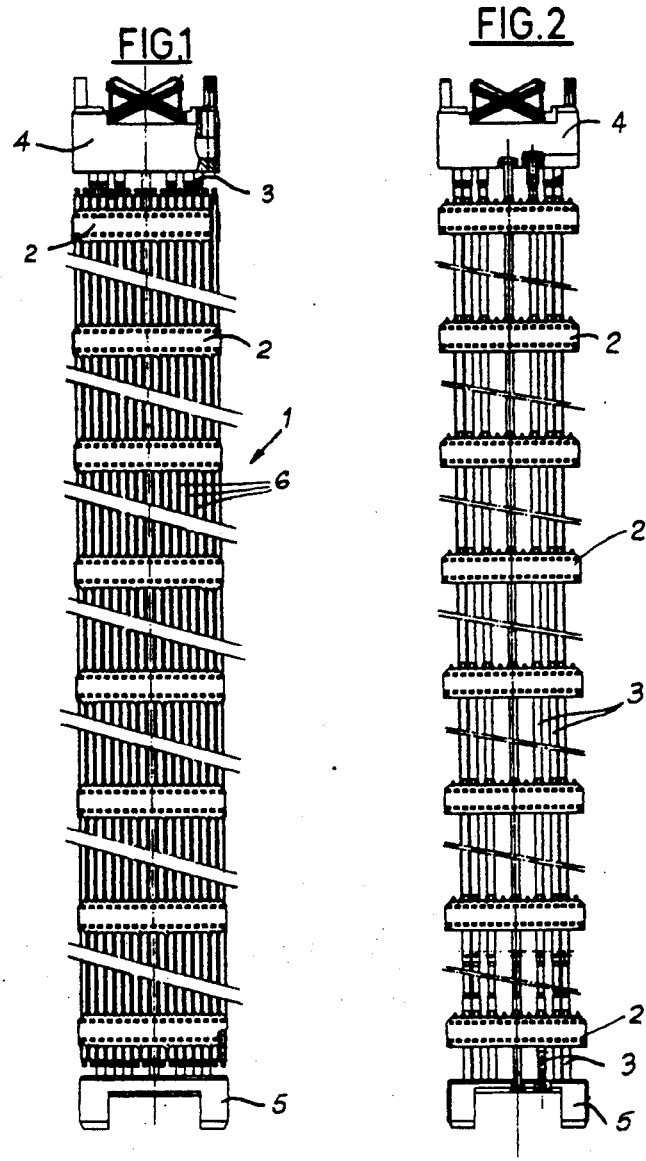

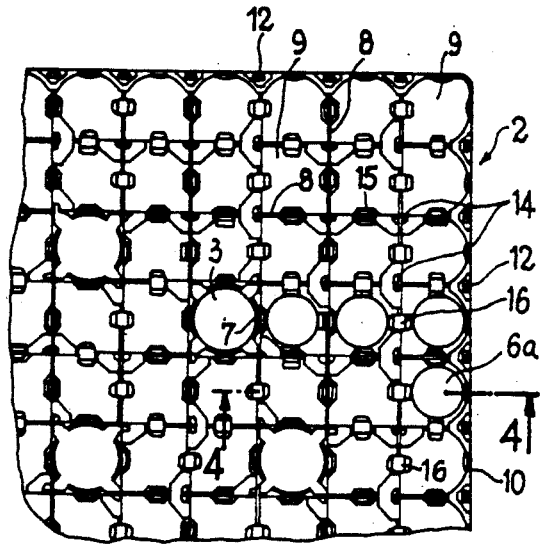
FIG_3
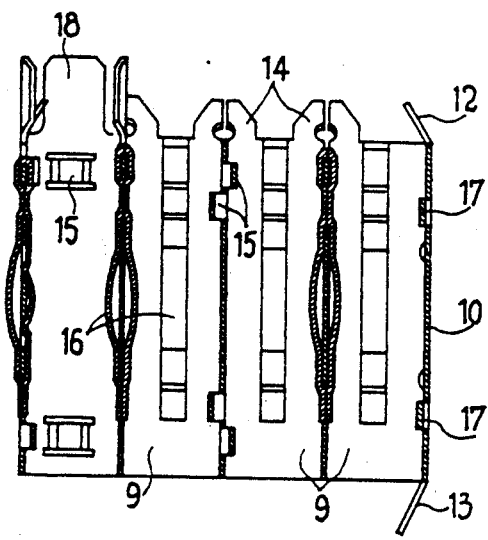
FIG_4

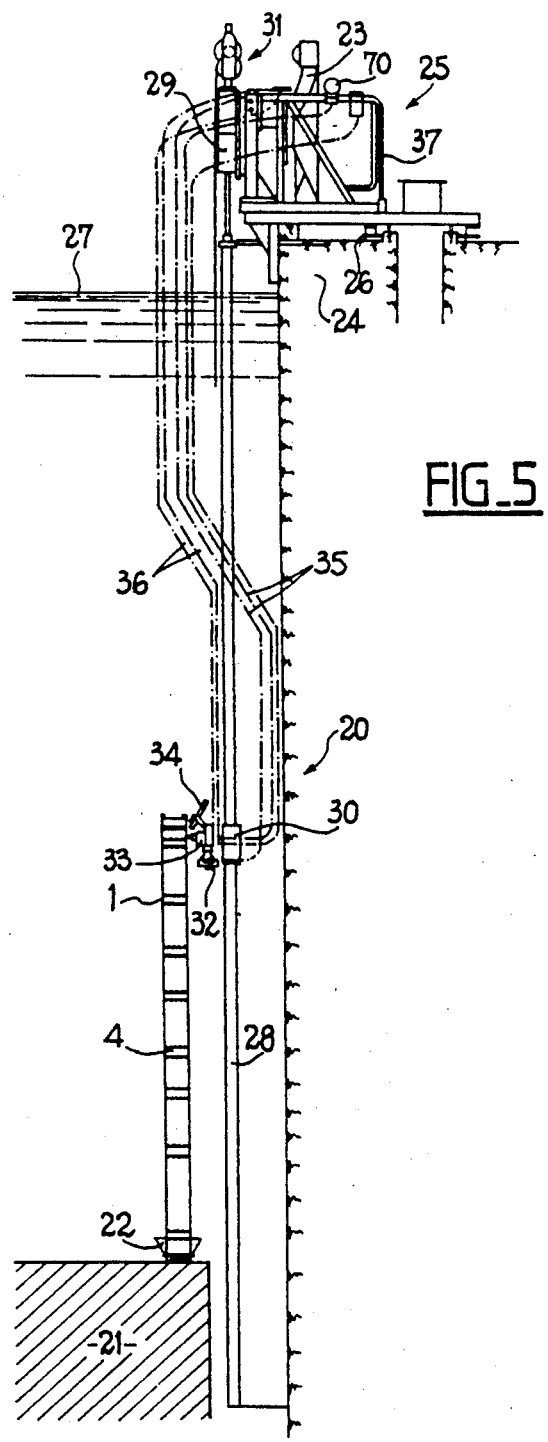
FIG_5

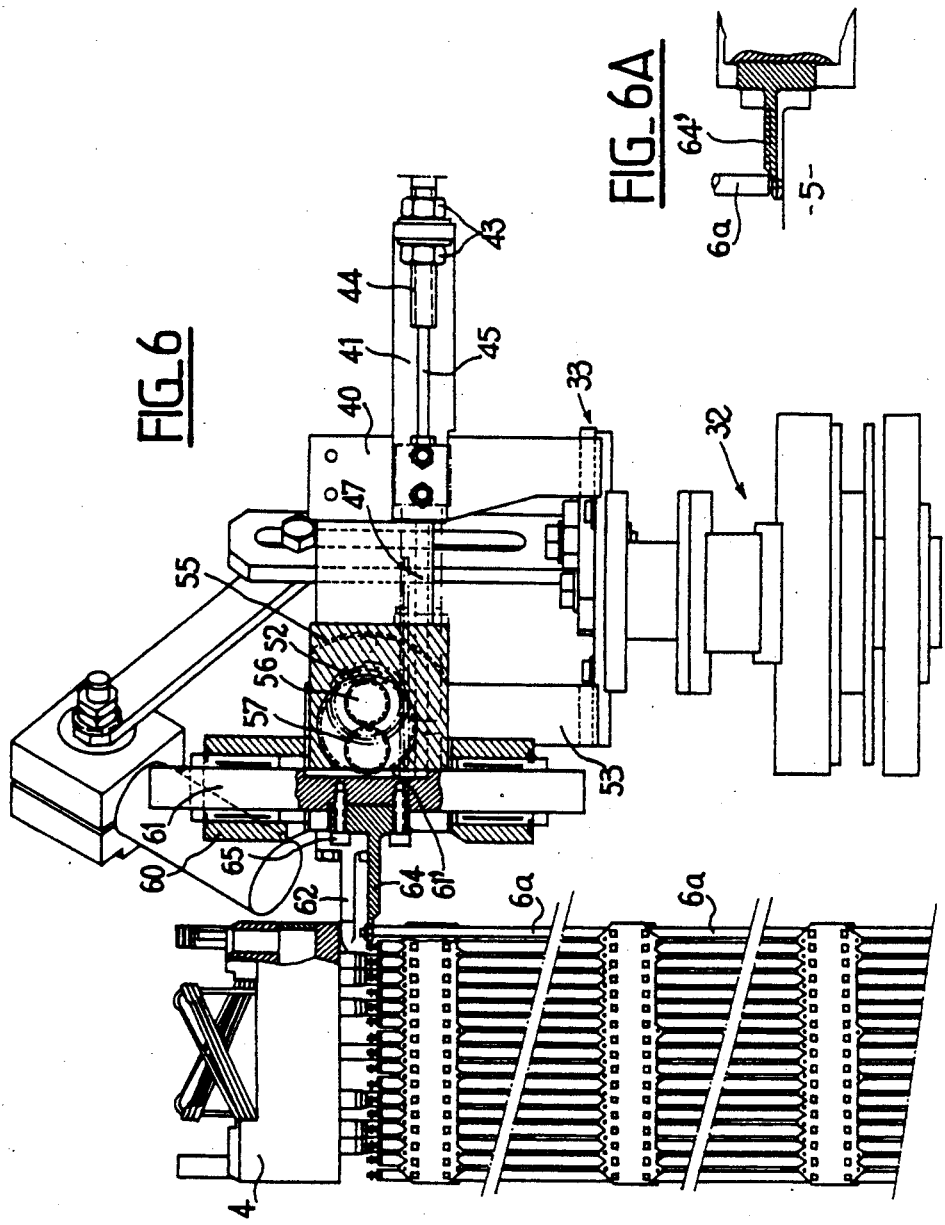

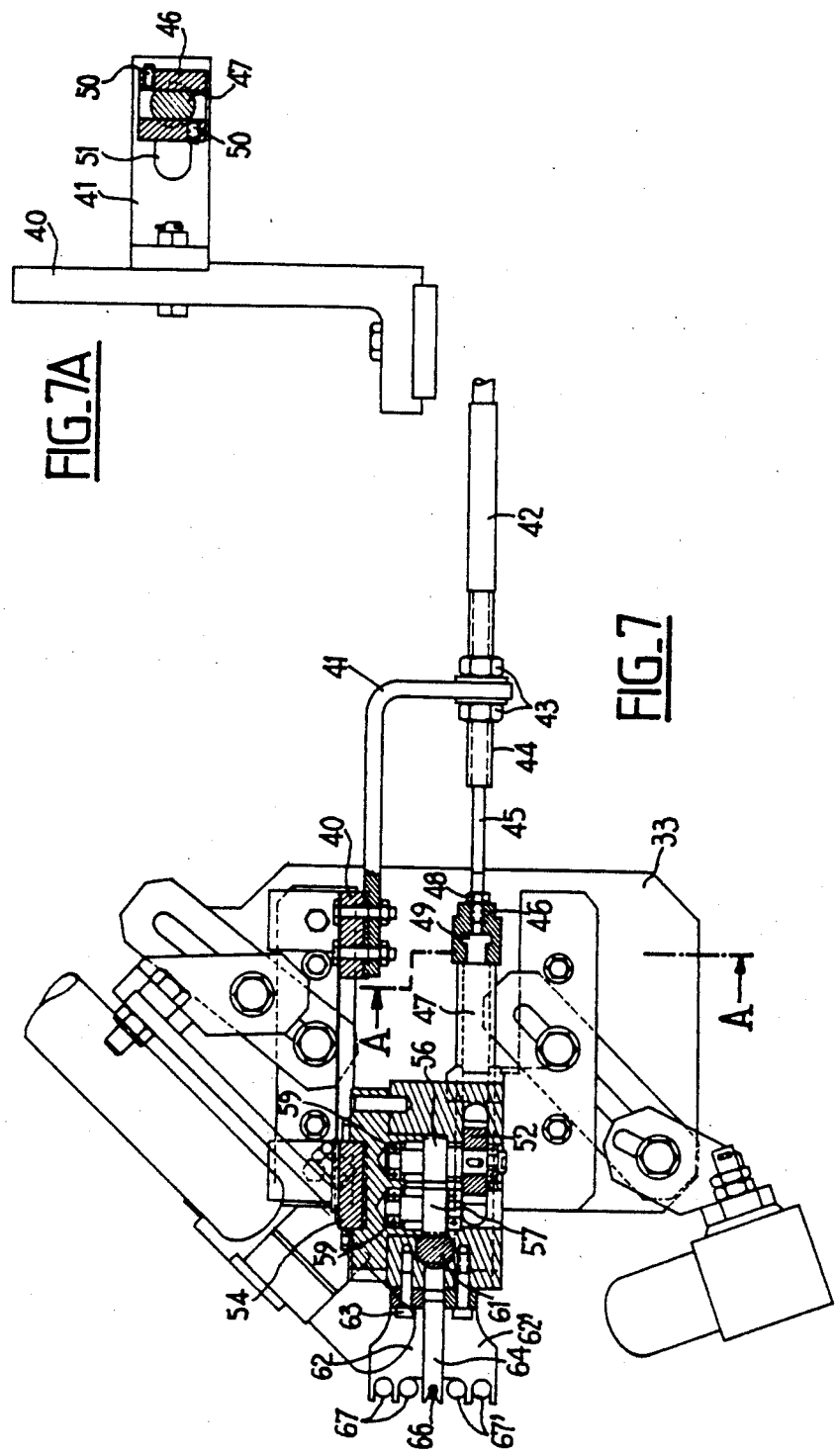

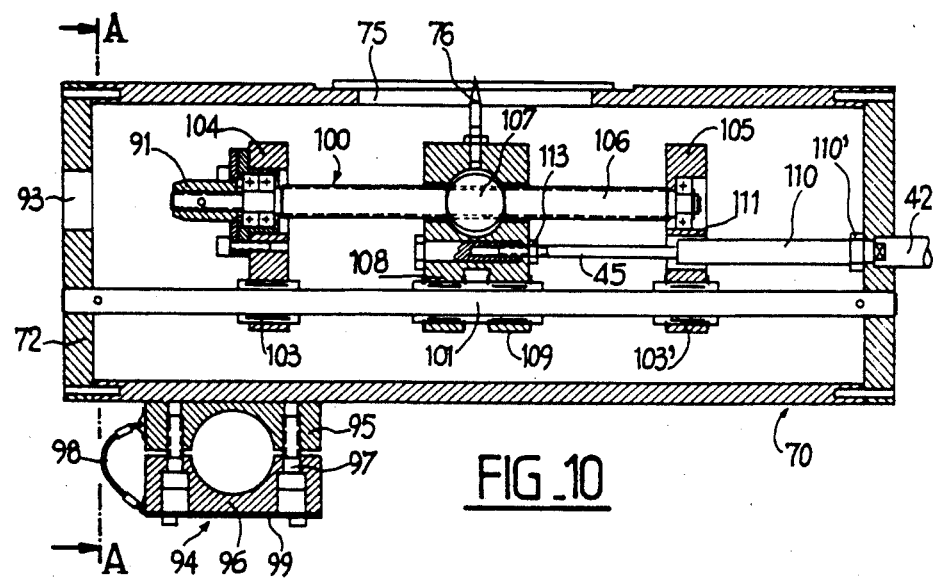
FIG_10
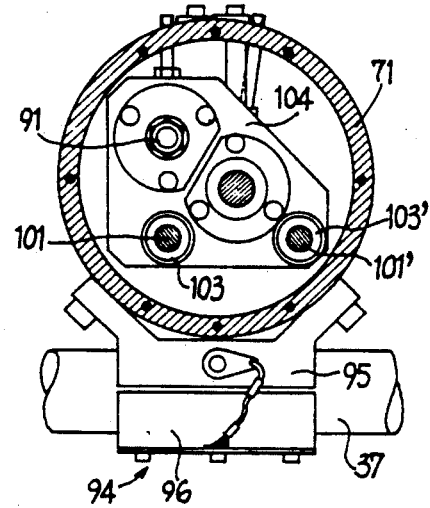
FIG_10A

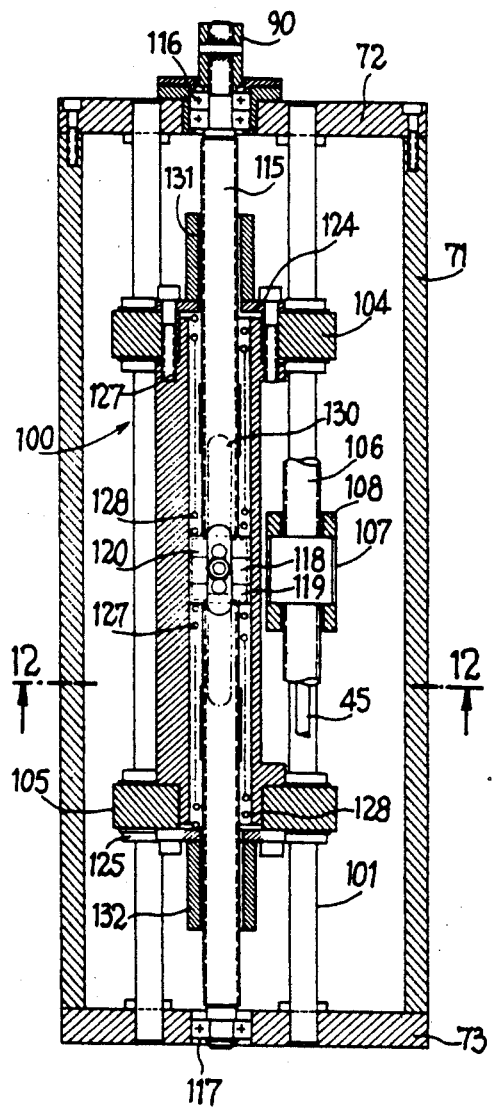
FIG_11
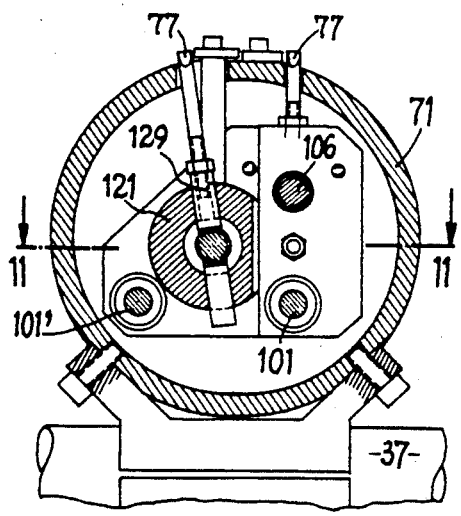
FIG_12

DEVICE FOR CHECKING THE AXIAL RETENTION FORCE ON A PERIPHERAL FUEL ROD OF A FUEL ASSEMBLY OF A NUCLEAR REACTOR

FIELD OF THE INVENTION

The invention relates to a device and a method for checking the axial retention force on a peripheral rod of a fuel assembly of a nuclear reactor.

BACKGROUND OF THE INVENTION

The fuel assemblies of water-cooled nuclear reactors, such as pressurized-water nuclear reactors, comprise a framework in which fuel rod of great length are disposed in order to form a bundle. The framework comprises spacer grids which are spaced relative to one another along the length of the assembly and connected together by guide tubes.

Each of the spacer grids comprises an assembly of cells each intended to receive a fuel rod and disposed in a uniform network, generally with squared mesh.

At the level of each of the cells intended to receive a fuel rod, the spacer grids comprise means for gripping the pencil, while also ensuring both transverse retention and longitudinal retention of this rod. These gripping means generally consist of bosses projecting inwards relative to the walls of the cell of the grid and of springs consisting of resilient elements formed in the metal of certain walls of the cells of the grid or, alternatively, connected to these walls.

When a new fuel assembly is charged in the nuclear reactor, it has mechanical and physical characteristics which are in accordance with the manufacturing and design standards which are defined or calculated so that the assembly can fulfill its function under the operating conditions of the reactor without suffering any excessive damage during a specific number of operating cycles.

Bearing in mind the irradiation of the materials, the mechanical characteristics of the constituents of the reactor evolve but remain within specific limits ensuring safety of operation.

In particular, with regard to the fuel assemblies, the spring and boss assemblies distributed in a uniform manner in the cells of the grids must retain mechanical characteristics and, in particular, strength and resilience characteristics which are sufficient to ensure effective retention of the fuel rods during a long operating period of the reactor.

However, in order to improve safety and performance in nuclear reactors, it has been considered that it was desirable to check, periodically, the efficiency of the means for gripping the fuel rods in the assemblies in the core of the reactor.

This checking must be performed during a discharging and refueling operation of the nuclear reactor, the assemblies being placed in a storage pool under a certain depth of water which makes it possible to ensure the biological protection of the operators responsible for the checking.

A purely visual examination performed, for example, using video means, does not make it possible to detect those fuel rods whose gripping has become insufficient and, in particular, those rods on which is exerted an axial retention force which no longer makes it possible to ensure effective retention of the rod during operation of the reactor. In fact, in this case, the rod may be caused to vibrate by the passage of the cooling fluid of the reactor, such that the rod which has been caused to vibrate is liable to suffer breakage. In this case, the pellets of uranium disposed in the sheath of the rod are dispersed in the primary shell of the nuclear reactor and cause high levels of contamination in this primary shell.

A device described in U.S. Pat. No. 4,265,010 is known, which makes it possible to replace, in correct position, those fuel rods which have undergone a certain axial slide. This device comprises two parallel plates, the gap between which may be varied by means of a displacement control device. One of the plates rests on an end joining piece of the assembly and the other plate, comprising a centering dish, rests under the end of the rod whose upward displacement inside the assembly is to be ensured in order to replace it in correct position. However, such a device does not make it possible to measure the gripping and longitudinal retention force on the rod in order to determine whether there is a risk of displacement of and damage to the rod during refueling of the assembly in the nuclear reactor.

Patent EP-A-0,146,804 describes a remotely controlled device for lifting fuel rods. The fuel rods are displaced so as to cause the support points of the sheath to pass over the gripping means above the grid of the assembly in order to inspect possible defects in the sheath by video means. This device does not make it possible directly to measure the axial retention force on the fuel rod.

Moreover, the device, which is awkward to use, can be used only at the level of the lower joining piece of the assembly and does not make it possible to lower the rods back into their initial position.

Moreover, it is desirable to be able to perform checks on the assemblies without having to remove their end joining pieces; this operation is possible only in respect of specially designed assemblies and, in any case, requires a complicated work tool and procedure. It is thus necessary to limit checking to the peripheral rods of the assembly which are the most stressed and the most likely to have gripping defects after a certain residence time in the operating reactor.

In particular, devices are known which comprise a means for axial pushing on an end of a rod and means for measuring the pushing force on the rod which may be operated and activated remotely. However, such devices are not designed to perform precise measurements.

SUMMARY OF THE INVENTION

The invention is a device for checking the axial retention force on a peripheral rod of a fuel assembly of a nuclear reactor inside the framework of the assembly, comprising a plurality of spacer grids retaining the fuel rods in a uniform network in transverse directions and in the axial direction of the rod by virtue of gripping means associated with the cells of the grid in which the rods are inserted, checking being performed remotely and under a certain depth of water in a fuel assembly storage pool, by virtue of the device which comprises:
a rod of great length on which is mounted a means for support and displacement which is movable in an axial direction of the rod and in two directions perpendicular to this axial direction,
a device for pushing axially on a longitudinal end of the rod carried by the means for support and displacement, consisting of a fork comprising an end notch for its engagement on a shoulder of an end plug of the rod, which fork is fixed on an element which is movable in the vertical direction in a guide means fixed on the means for support and displacement, and of at least one support fork on a face of a corresponding end joining piece of the fuel assembly, which fork is fixed on the means for support and displacement, the vertical displacement of the movable element being provided by a remote control means, means for measuring the axial pushing force on the rod and the amplitude of the axial displacement of the rod under the effect of the pushing action, disposed at the upper level of the storage pool, and at least one video camera carried by the means for support and displacement in order to provide an image of a zone in the vicinity of the end of the rod on which a pushing action is being exerted, this device being relatively simple to use and making it possible remotely to obtain a precise measurement of the axial retention force on the fuel rod.

To this end, the movable element consists of a sliding shaft on which is machined a rack of vertical direction, the remote control means consisting of a ball remote control whose flexible movable element is connected to the end of a rack engaging with a drive pinion driving the displacement of the rack and the movable element by means of at least one pinion.

The invention also relates to a checking method implementing the device according to the invention.

BRIEF DESCRIPTION OF THE DRAWINGS

In order that the invention may be more clearly understood, a description will now be given, by way of example and with reference to the attached drawings, of an embodiment of a device according to the invention and its application to the checking of the axial retention force on the peripheral rods of a fuel assembly of a pressurized-water nuclear reactor.

FIG. 1 is a view in elevation of a fuel assembly of a pressurized-water nuclear reactor.

FIG. 2 is a view in elevation of the framework of the assembly shown in FIG. 1.

FIG. 3 is a plan view of part of a spacer grid of the framework of the assembly shown in FIG. 2.

FIG. 4 is a sectional view along line 4—4 in FIG. 3.

FIG. 5 is an overall view in elevation of the checking device according to the invention in a service position at the level of a fuel assembly located in a storage pool.

FIGS. 6, 7 and 8 are views showing the axial pushing device and the examination means carried by the means for support and displacement of the device.

FIG. 6 is a front view with partial section.

FIG. 6A is a view showing the arrangement of the means for pushing a fuel rod at the level of the lower joining piece of an assembly.

FIG. 7 is a plan view, partly in section.

FIG. 7A is a sectional view along line A—A in FIG. 7.

FIG. 8 is a side view, partly in section.

FIG. 10 is a sectional view along line 10—10 in FIG. 9.

FIG. 10A is a sectional view along line A—A in FIG. 10.

FIG. 11 is a sectional view along line 11—11 in FIG. 12 with representation of the displacement control of the pushing device.

FIG. 12 is a sectional view along line 12—12 in FIG. 11.

FIG. 13 relates to the upper end of a rod and FIG. 14 to the lower end.

DESCRIPTION OF PREFERRED EMBODIMENT

Figure 8:
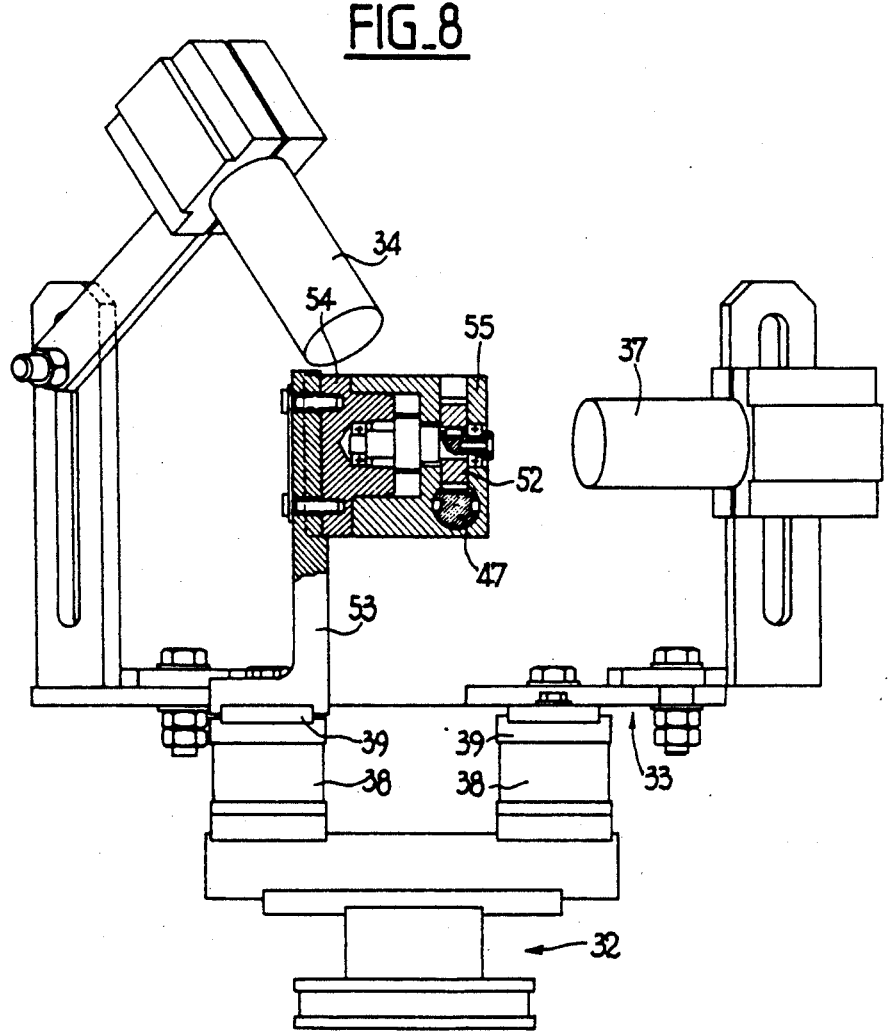

FIG. 1 shows a fuel assembly which comprises a framework shown in FIG. 2 and consisting of spacer grids 2 spaced in the longitudinal direction of the assembly, guide tubes 3 to which the grids 2 are rigidly fixed, an upper joining piece 4 and a lower joining piece 5 which are fixed to the fuel rods 6 of the assembly, which are shorter.

The fuel pencils or fuel rods of the assembly which have a than the guide tubes 3, are disposed in the framework so as to form a bundle in which the rods are disposed parallel to one another.

The rods are held laterally by the spacer grids 2 so as to form a uniform network with squared mesh, in the transverse sections of the assembly.

The spacer grids 2 also ensure the retention of the fuel rods 6 in their longitudinal direction by virtue of gripping means which will be described with reference to FIGS. 3 and 4.

FIG. 3 shows a spacer grid 2 consisting of an assembly of small metal plates 8 disposed and assembled at a right angle so as to form a network with squared mesh, the cells 9 of each of which can receive a fuel rod 6 in order to ensure its positioning in the network, its lateral retention and its longitudinal retention. Certain cells 7 are intended to receive a guide tube 3 which is fixed rigidly on the walls of the cell 7.

The spacer grids 2 and the guide tubes 3 thus form a rigid framework which is capable of receiving the fuel rods 6 which can be slid, via one end of the assembly, into an assembly of cells 9 in alignment in the longitudinal direction of the framework, as shown in FIG. 2.

Each of the cells 9 intended to receive a fuel rod comprises bosses 15 projecting inwards in the cell 9 and springs 16 generally comprising two active parts in two adjacent cells 9 of the spacer grid.

In each of the cells 9, two walls at 90° each comprise two bosses 15 projecting inwards in the cell 9 and the two other walls at 90° each comprise a convex part projecting inwards in the cell 9 and in an intermediate position between the bosses 15 in the height of the spacer grid 2.

Each of the rods 6 of the assembly is thus in contact with four bosses and two springs inside each of the cells 9. The fuel rod 6 is thus retained by contact of the sheath of this rod at six points with the gripping means of the cell.

In the embodiment of a spacer grid shown in FIGS. 3 and 4, the springs 16 are made of a nickel alloy and are attached to the small plates 8 made from zirconium alloy. The bosses 15 are produced by deforming the metal of the small plates 8.

The spacer grid 2 is delimited, at its outer contour whose square form corresponds to the section of the fuel assembly, by a frame consisting of small plates 10 assembled at a right angle at the corners of the spacer grid 2.

As may be seen in FIGS. 3 and 4, the upper edge of each of the small plates 10 is cut in order to form successive fins 12 which are folded towards the inside of the spacer grid in order to form, with the plane of the small plate 10, an angle α of well-defined value.

The lower edge of each of the small plates 10 of the frame of a spacer 2 of the assembly also comprises guide fins 13 folded towards the inside of the spacer.

The spacer grids also comprise, in the extension of the upper edge of each of the cells 9 receiving a fuel rod, fins 14, called mixing fins, used for mixing the cooling water circulating in contact with the rod where it emerges from the spacer grid. A homogenization of the temperature of the water removing the heat supplied by the fuel rods of the assemblies is thus obtained.

The small plates 10 of the frame of the spacer grid 2 also comprise two bosses 17 at the level of each of the cells 9, which project inwards in the corresponding cell.

The fuel rods disposed in rows adjacent to the small plates 10 of the frame of the spacer grid, such as the rod 6a, and referred to as peripheral rods, are held by two springs 16, two bosses 15 and two bosses 17, these rods being held in each of the cells 9 by contact at six points, like the other rods of the fuel assembly.

A sleeve 18, by means of which fastening of the guide tube 3 is ensured, is fixed in each of the cells 7 intended to receive a guide tube 3.

The metal forming the support bosses 15 and 17 and the retention springs 16 undergoes, in the environment of the reactor, under irradiation, transformations which can result in a loss of hardness or of resilience.

In certain cases, the axial retention force on the pencil is no longer sufficient to ensure its support and the pencil is displaced downwards inside the framework.

The peripheral rods 6a disposed in the cells 9 adjacent to the plates 10 of the frame of the spacer grid are particularly stressed and may be displaced longitudinally or subjected to vibrations which cause their breakage.

It is thus desirable to be able to check that the retention forces on the peripheral rods 6a of the assembly have retained sufficient values before refueling, in the core of the reactor, of a spent assembly.

The device according to the invention, shown in FIG. 5 and denoted generally by the reference 20, makes it possible to check the axial retention forces on the peripheral rods of an assembly 1 disposed inside a fuel assembly storage pool.

The fuel assembly 1 rests, by means of its lower joining piece 5, on a support 21, the positioning of the assembly in a vertical checking position being facilitated by an insertion device which is flared towards the top 22, fixed on the base 21 and which receives the lower part of the assembly.

The upper part of the assembly is located at a depth, below the upper level 27 of the pool, substantially equal to three meters, this depth of water ensuring effective biological protection for an operator 23 conducting the checking operations from the platform 26 of a control station 25 fixed on the top part 24 of a lateral wall of the pool.

The device according to the invention comprises a rod 28 of great length disposed vertically in the vicinity of the wall 24 of the pool and connected at its upper part 29 to a vertical support which is integrally attached to the platform 26.

A carriage 30 is mounted so as to be movable in the longitudinal direction of the rod 28 and may be displaced in this longitudinal direction by means of a winch 31 which may be activated by a handle used by the operator 23.

The carriage 30 carries, by means of a displacement device 32, a support 33 on which is fixed the pushing device of the checking assembly 20 and at least one video camera 34.

The insertion device 22 is unable to interfere with the positioning and implementation of the device for pushing on the rod 6a.

The pushing device is remotely controlled by remote control means 35 of known type, such as ball remote controls, comprising a sheath inside which a flexible element is mounted so as to be movable and which makes it possible to provide a pulling or pushing action which is remotely controlled, for example manually.

The ends of the ball remote controls 35 opposite to the support 33 of the pushing device are connected, in the manner which will be described hereinbelow, to control and measurement devices fixed on the railing 37 of the platform 26 of the control station 25.

Ball remote controls 36 also make it possible to orient the video cameras, such as 34, so as to provide the operator 23 in the control station 25 with a video image of the zone in which checking is being performed on the retention force on a peripheral rod of the assembly 1.

In FIG. 5, the carriage 30 and the displacement device 32 are in a position which makes it possible to push on the upper end of a peripheral rod 6a of the assembly in the vicinity of its upper joining piece 4.

The device for the support and positioning of the pushing device is the subject of a patent application filed jointly by the company FRAMATOME and the company COGEMA on the same day as the present patent application.

FIGS. 6 to 8 show the displacement device 32 of the support 33 which consists of a crossed carriage displacement assembly. This displacement assembly is fixed on the carriage 30 so as to be movable in the vertical direction and comprises a first carriage, or lower carriage, which is movable in a first horizontal direction substantially perpendicular to the wall 24 of the pool, on which a second carriage, or upper carriage, carrying the support device 33 is mounted so as to be movable in a second horizontal direction substantially parallel to the wall of the pool 24.

The vertical displacement carriage 30 and the crossed carriage assembly 32 makes it possible to place the support 33 and the pushing device carried by this support above the upper end of any peripheral rod of the assembly or below the lower end of each of the peripheral rods.

The displacements of the crossed carriage assembly 32 can be ensured by ball remote controls, such as the remote controls 35 and 36, whose upper part is accessible from the control station 25. A video image of the work zone provided by the camera 34 enables the operator to place the support 33 and the pushing device in the desired position.

A description will now be given, with reference to FIGS. 6, 7 and 8, of the pushing device carried by the support 33.

The support 33 consists of two support bases 38 on which are fixed, by means of accurate positioning adjusters 39, brackets for fixing the various elements of the pushing device and the video cameras 34 and 37.

Two brackets 40 and 41 connected together by means of fixing screws and nuts support the end of the sheath 42 of a ball remote control comprising a threaded part 44 engaged in an opening provided in the end of the bracket 41. The end of the sheath is fixed by nuts 43 engaged on the threaded part 44 on either side of the bracket 41.

Inside the sheath 42, the ball remote control comprises a flexible element 45 mounted so as to move in the axial direction by virtue of balls ensuring low-friction guiding.

The flexible element 45 is connected, by means of a joining piece 46, to the end of a rack 47 controlling the pushing device of the fuel rods which will be described hereinbelow. The end of the flexible cable 45 is rigidly fixed on the joining piece 46 by means of a nut 48. The joining piece 46 comprises a groove 49 in which a profiled a part of corresponding form machined at the end of the rack 47 may be engaged. A link is thus provided between the flexible element 45 and the rack 47 which makes it possible to transmit the pushing or pulling action of the flexible element 45 to the rack 47.

As may be seen in FIG. 7A, screws 50 make it possible to fix the rack 47 on the fixing piece 46.

This figure also shows that the bracket 41 comprises an oblong aperture 51 in which the end of the sheath 42 fixed by means of the nuts 43 is engaged. This oblong opening 51 makes it possible to adjust the alignment of the remote control relative to the rack 47 for controlling the pushing device.

A bracket 53 fixed on one of the studs 38 and forming a support part 33 carries a fixing body 54 of a housing 55 in which are disposed the control pinions for the device for pushing the rods. The rack 47 engages, inside the housing 55, with a first pinion 52 mounted in the housing by means of a shaft on which is placed a second pinion 56 engaging with a third pinion 57 which is also mounted in the housing 55 by means of ball bearings 59. A tubular support 60, in which are fixed two ball bushes, is integrally mounted with the bracket 53 of the support 33 in a vertical direction. A shaft 61 is mounted so as to slide in the vertical direction inside the ball bush 60 and comprises a central part 61' forming a rack on which the pinion 57 engages.

The actual pushing element of the device for pushing the rods consists of two support forks 62, 62' made integral by means of screw 63 of the body 54 fixed on the bracket 53 and a pushing fork 64 disposed between the support forks 62 and 62' and made integral by screws 65 of the sliding shaft 61.

The support forks 62 and 62' each comprise an end part comprising two inner recesses 67, 67' which enable the support forks 62, 62' to engage around the guide tubes 3 in their end part located below the upper joining piece 4.

In their operating position, as shown in FIG. 6, the forks 62 and 62' of the pushing element rest on the lower surface of the upper joining piece 4 of the assembly.

The pushing fork 64 comprises, at its end, an inner recess 66 which can be engaged on the small-diameter part of a plug forming the end part of a peripheral rod 6a on which pushing is effected by means of the device shown in FIGS. 6, 7 and 8.

By pushing on the flexible element 45 of the remote control, the rack 47 is displaced, driving the pinion 52 and, by means thereof, the pinions 56 and 57, in rotation. The pinion 57 drives the shaft 61 in a downward-directed vertical displacement which is transmitted to the pushing fork 64. The end of the pushing fork 64, engaging with the shoulder of the plug of the peripheral rod 6a, transmits a downward-directed pushing action to this rod.

The device is positioned in its operating position, shown in FIG. 6, by the crossed carriage assembly 32 under the control of video cameras, such as 34, providing the operator placed in the control station 25 with an image of the zone in the vicinity of the upper end of the rod 6a.

FIG. 6A shows the position of a pushing fork 64' which makes it possible to exert an upward-directed pushing action on the lower end of a peripheral rod 6a in the vicinity of the lower joining piece 5 of the assembly. The fork 64' has an identical form to the fork 64. This fork is mounted, in a position which is reversed relative to the position of the fork 64, on the body of the pushing device. The support forks 62, 62' rest on the upper surface of the lower joining piece 5 of the assembly.

Figure 9:
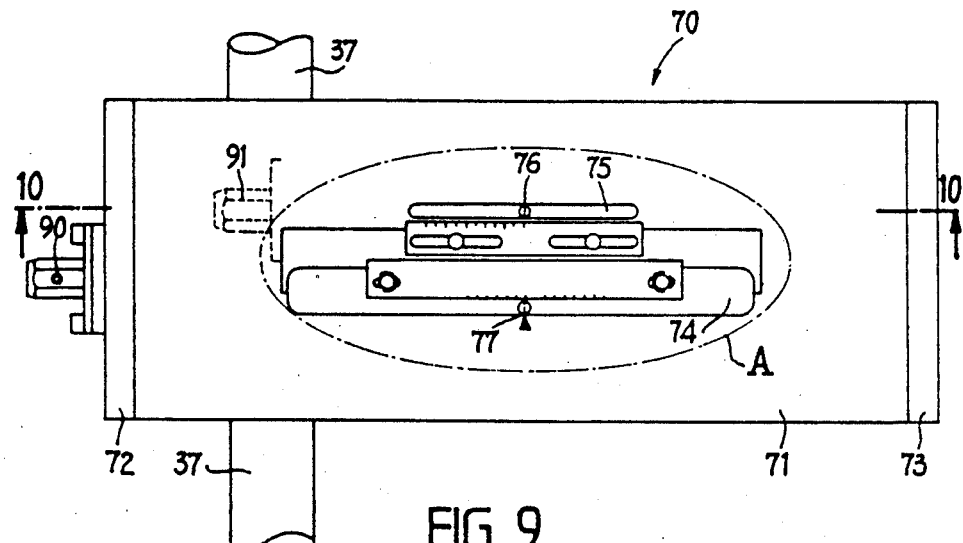
FIG. 9 is a plan view of an assembly comprising the means for controlling the pushing device and the measurement means which are disposed at the upper level of the storage pool.

FIG. 9 shows an assembly for the control and measurement of displacement and pushing force which is denoted generally by the reference 70, this control and measurement assembly being fixed on the railing 37 of the platform 26 of the control station 25.

This assembly 70 comprises a casing 71 of tubular form which is closed at its ends by end plates 72 and 73.

Figure 9A:
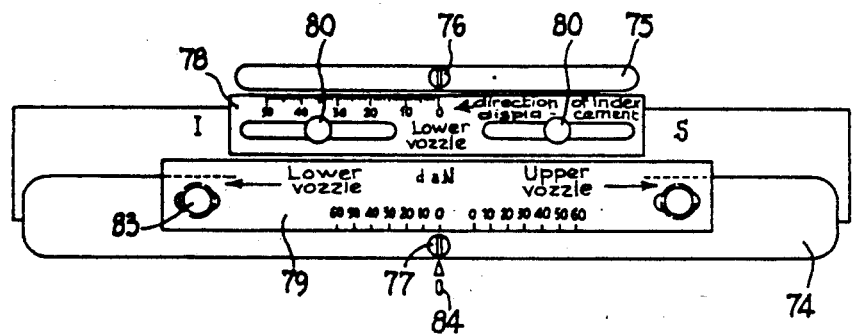
FIG. 9A is an enlarged view of the detail A in FIG. 9.

The cylindrical housing 71 comprises, in its upper part shown on a larger scale in FIG. 9A, oblong openings 74 and 75 permitting the longitudinal displacement of corresponding indicators 76 and 77 as well as two measurement scales 78 and 79 comprising graduations which permit direct referencing of the displacements of the indicators 76 and 77, respectively.

The graduated rule 78 makes it possible to evaluate, in the manner which will be described hereinbelow, the displacement of the rod as a function of the pushing force exerted on its end.

The graduated rule 78 is fixed on the cylindrical body 71 by means of screws 80 engaged in oblong openings in the graduated rule 78.

In its position shown in FIG. 9A, the graduated rule 78 makes it possible to measure the displacement of a pencil under the effect of a pushing action on its lower part, resting on the lower joining piece 5. The lefthand end of the rule 78 coincides with a reference I marked on the upper part of the cylindrical body 71. The rule 78 is graduated in millimeters, from 0 to 50 mm.

In order to measure the displacement of a rod by pushing at the level of the upper joining piece, it suffices to turn the graduated rule 78 over by removing the screws 80, the righthand end of the graduated rule 78 coinciding with the reference S marked on the body 71.

The oblong openings make it possible to perform a certain adjustment of the position selected as origin, as will be described hereinbelow.

A second graduated rule 79 is fixed by screws 83 engaged in oblong openings in the rule 82 inside the body 71.

The rule 82 comprises two graduated symmetrical parts which make it possible to measure the pushing force exerted on the rod by virtue of the position of the indicator 77. One of the scales corresponds to a pushing action on a fuel rod at the level of the lower joining piece and the other graduated scale corresponds to the pushing action on a rod at the level of the upper joining piece. A position of origin 84 is indicated on the body 71.

As may be seen in FIG. 9, a profiled end 90 of a control screw is mounted so as to project outwards relative to the end plate 72. A second profiled end 91 of a control screw, shown in dotted lines, is disposed inside the casing 71, this end being accessible via an opening 93 in the end plate 72, which may be seen in FIG. 10.

The casing 71 of the control and measurement assembly 70 is fixed on the railing 37 by means of a gripping yoke 94 comprising an upper flange 95 fixed on the casing 71 and a lower flange 96 which can be clamped against the flange 95 by screws 97 after engagement of the two half flanges on the railing 37.

A joining cable 98 makes it possible to connect the two half flanges when the screws 97 are removed. A plate 99 then retains the screws 97 which thus cannot be lost. The plate 99 comprises openings for the passage of a wrench for tightening the screws 97.

As may be seen in FIGS. 10, 10A, 11 and 12, two guide columns 101 and 101, are mounted in the longitudinal direction of the casing 71.

An inner movable assembly 100 is mounted so as to slide by means of ball bushes 103 and 103' on the columns 101 and 101'.

The movable assembly 100 comprises two end plates 104 and 105 on which are fixed the ball bushes, such as 103 and 103'. A maneuvering screw 106, integrally attached at its end to the maneuvering part 91, is mounted so as to rotate, by ball bearings, in the flanges 104 and 105. The screw 106 is mounted in the longitudinal direction in a position which is offset relative to the axis of the casing 71, located perpendicular to the guide column 101.

A nut 107 comprising an internal thread is engaged on the screw 106 so that the nut 107 can be displaced by rotating the screw 106 from the control profile 91. The nut 107 is engaged in an opening of corresponding form provided between two parts which are assembled together of a lateral carriage 108 mounted so as to slide, by virtue of ball bushes 109, on the column 101. The position measurement indicator 76 is fixed on the lateral carriage 108 so that its end penetrates into the longitudinal aperture 75 of the casing 71.

The end of the sheath 42 of the ball remote control opposite to the end connected to the pushing device, shown in FIGS. 6, 7 and 8, is fixed on the end plate 73 by means of a threaded part 110 on which a fixing nut 110' is engaged. The end of the sheath and the flexible element 45 pass through the flange 105 of the inner movable assembly 100 at the level of an opening 111. The end of the flexible element 45 projecting relative to the sheath 42 beyond its part 109 is fixed, by virtue of a threaded part and a nut 113, to the lateral carriage 108.

The carriage 108 may be displaced in the longitudinal direction of the casing 71 by screw 106 which may be rotated by inserting a tool in the opening 93 of the end plate 72 of the casing, the tool being engaged on the control profile 91. The carriage 108 is guided in its displacements by the ball bushes 109 mounted so as to slide on the column 101. The displacements of the carriage 108 result in a displacement of the flexible element 45 inside the sheath 42, either in the direction of the pushing action or in the direction of the pulling action, according to the direction of rotation imparted to the screw 106. The indicator 76 makes it possible to reference the displacements of the carriage 108 and thus the displacements of the flexible element 45 of the ball remote control inside the sheath 42.

Reference will now be made to FIGS. 11 and 12 in order to describe the part of the device which makes it possible to displace the inner movable assembly 100 inside the casing 71.

A threaded shaft 115 is mounted so as to move in rotation, along the entire length of the casing by virtue of rolling bearings 116 and 117 fixed in the end plates 72 and 73. An end of the threaded shaft 115 projecting outwards relative to the end plate 72 is integrally attached to the control profile 90 on which it is possible to engage a tool in order to rotate the threaded shaft in one direction or another.

A nut 118 comprising an internal thread, on which the screw thread of the shaft 115 is engaged, is placed in a central position between two support dishes 119 and 120.

The movable assembly 100 comprises a sleeve 121 fixed, at its ends, to the flanges 104 and 105, respectively. Support plates 124 and 125 are fixed by screws to the outer face of the flanges 104 and 105, respectively.

Two helical springs 127 and 128 are inserted between a support dish 119 (or 120) and the corresponding closure plate 124 (or 125).

A rod 129, at the end of which the indicator 77 is fixed, passes through the wall of the sleeve at the level of an aperture 130 of longitudinal direction. Stops 131 and 132 made from a flexible material are fixed on the outer faces of the plates 124 and 125, respectively, in order to dampen the impacts on the end plates 72 (or 73) in the event of a faulty maneuver during displacement of the movable assembly 100.

Rotation of the threaded shaft 115 in one direction and in the other, by using a tool engaged on the control profile 90, produces a displacement of the nut 118 and of the support dishes 119 and 120 so as to compress one of the two springs 127 and 128.

The pushing action on the corresponding flange 104 (or 105), by means of the support plate 124 (or 125), produces a displacement of the movable assembly 100 and thus of the lateral carriage 108 when the compression of the spring produces a force which is sufficient to displace the carriage 108 and the movable flexible element 45, exerting a pushing action, by means of the pushing fork 64, on a peripheral rod 6a.

The displacement of the indicator 77 opposite the graduated rule 79 makes it possible to determine the pushing force, the spring 127 (or 128) which is compressed during displacement of the nut 118, acting as a dynamometric spring.

Figure 13:
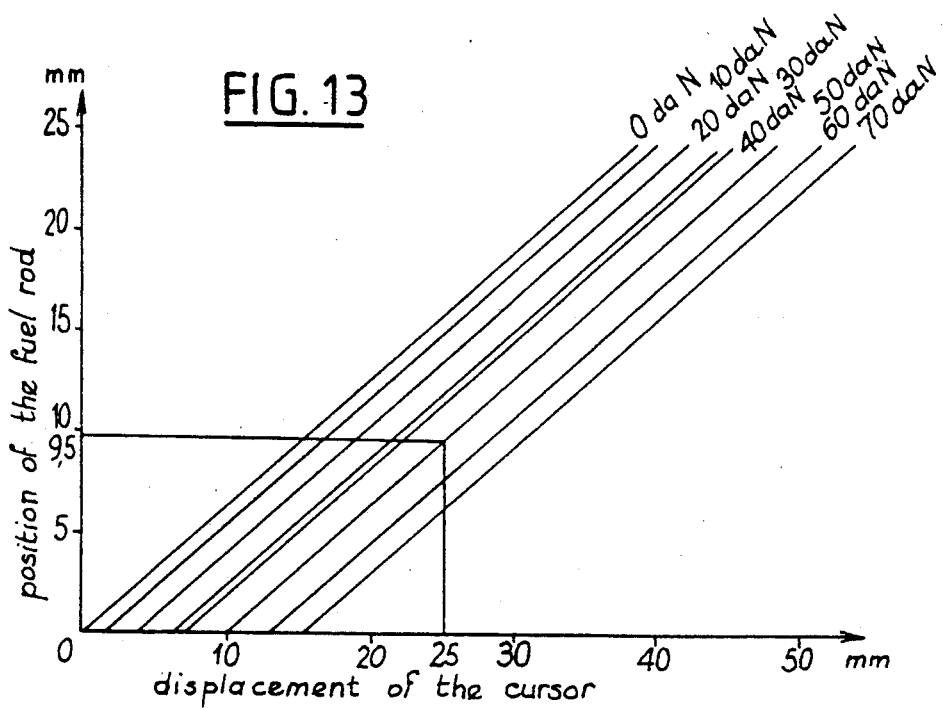
FIGS. 13 and 14 are charts giving the actual position of the end of a fuel rod as a function of the displacement of the indicator of the displacement measurement device and as a function of the pushing force exerted on the rod.
Figure 14:
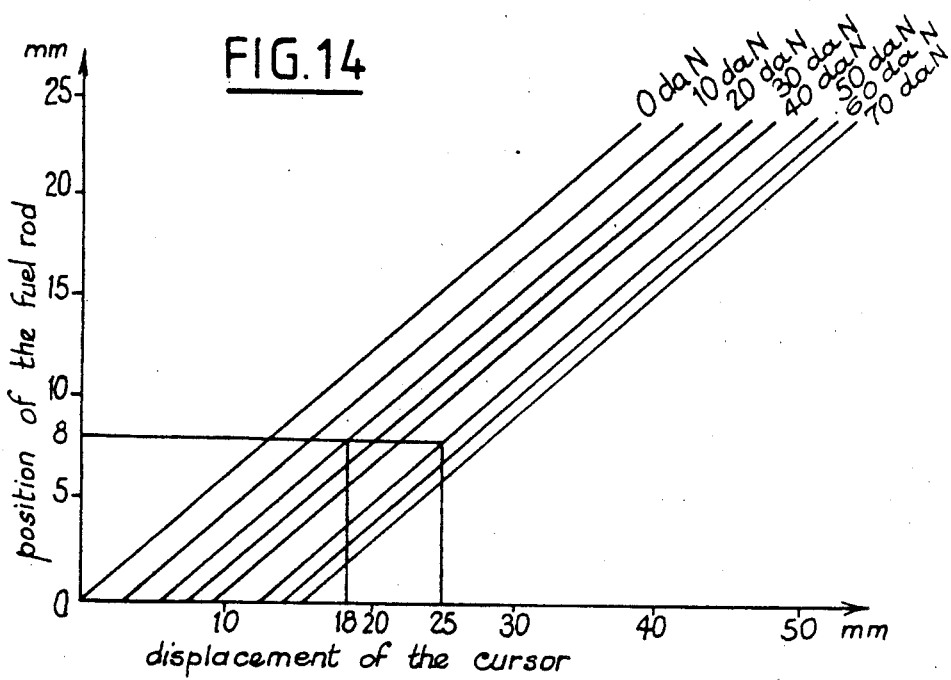

FIGS. 13 and 14 are charts which make it possible to determine the displacement of the pushing fork 64 as a function of the displacement of the indicator 76 and of the pushing force measured by virtue of the indicator 77 moving opposite the graduated rule 79.

In fact, the values of the displacements read on the graduated rule 78 do not correspond to the actual value of the displacement of the fuel rod 6a, bearing in mind the adjustment of the mechanical play of the device and due to the fact that the ball remote control is activated by pushing on the flexible element 45.

For example, in the case of FIG. 13 which relates to the pushing action on a fuel rod at the level of the upper joining piece of the assembly, a displacement of 25 mm of the indicator 76 on the graduated rule 78 corresponds to an actual displacement of the pushing fork 64 and of the rod 6a of 9.5 mm for a force of 50 daN.

FIG. 14 relates to the displacement of a fuel pencil which is pushed by means of a pushing fork 64 at the level of the lower joining piece of the assembly.

In the case of FIG. 14 which relates to a pushing action at the level of the lower joining piece of the assembly, a displacement of 25 mm of the indicator 76 on the graduated rule 78 corresponds to a displacement of the pushing fork 6 and of the fuel rod 6a of 8 mm for a force of 50 daN.

A description will now be given, with reference to all the drawings figure, of a pushing operation on a peripheral rod 6a which makes it possible to measure precisely the axial retention force on this rod in the assembly.

Before commencing the operation, the pushing device, for example such as shown in FIG. 6, is equipped with support forks 62, 62' and with a pushing fork 64 so that it is capable of pushing the peripheral fuel rods 6a either from the upper joining piece or from the lower joining piece.

It is thus appropriate to select a pushing fork 64 whose form may be different according to the types of plugs for the rods being pushed. It is also appropriate to place this fork and the corresponding support forks in the desired position on the pushing support 61 formed by the sliding shaft and on the support in which the ball bushes 60 are fixed, respectively. The pushing fork is fixed in the desired direction, inside a housing provided on the sliding shaft 61 in its central part comprising the rack 61'. The pushing fork is fixed by means of the two screws 65.

Then the entire displacement and measurement device placed at the control station and shown, in particular, in FIGS. 9 and 9A, is adjusted.

The graduated rule 78 is mounted which makes it possible to measure displacement, in the desired direction according to the type of operation chosen, i.e., in the case of a pushing action from the upper joining piece of the assembly or in the case of a pushing action from the lower joining piece. The position of the adjuster is defined according to the circumstances by the reference I or the reference S marked on the surface of the casing 71.

The rule 79 comprising the graduation for measuring the force exerted (in daN) is then fixed. The graduation 0 of the corresponding scale (pushing action from the upper joining piece or pushing action from the lower joining piece) is placed opposite the reference 84.

By activating the control 91 of the screw 106, the indicator, 76 is displaced over a length of approximately 1 centimeter in the direction indicated by the arrow on the graduated rule 78. This adjustment operation must be performed without load, no force being applied on the pushing fork 64. This adjustment operation must be effected while the pushing tool is located inside the pool in a zone where no mechanical member or other obstacle risks coming up against the pushing fork.

A check is then made that the indicator 77 is located opposite the graduation 0 of the scale corresponding to the envisaged pushing operation.

If there is an offset relative to 0, the fixing screws 83 are loosened and the rule 79 is displaced in the desired direction before the screws 83 are retightened.

The pushing fork 64 is then accurately positioned, the pushing assembly being fixed on the support 33 which is itself placed on the displacement device 32 which is integral with the carriage 30.

In this phase, use is made of the control 91 of the screw 106 disposed inside the casing 71 in order to displace the indicator 76 up to the time when it coincides perfectly with the 0 of the graduation of the displacement measurement rule 78.

A check is made and, if appropriate, the indicator is reset to 0 on the corresponding dynamometric scale.

The pushing fork is then brought close to and engaged in the plug of the pencil. The support forks are placed in contact with the face directed towards the fuel pencils of the joining piece from which the pushing action is effected. This operation is performed by using the displacement means 30 and 32 and the means for visualizing the work zone, such as the video camera 34.

The pushing fork 64 is brought perpendicular to the plug of the rod 6a by using the control 91 located inside the casing which drives the screw 106 in rotation, permitting the displacement of the carriage 108 on which is fixed the end of the flexible element 45 which controls the pushing fork. The indicator 76 is displaced relative to its initial position indicating the 0 on the graduated rule 78.

The notched end part 66 of the pushing fork 64 is engaged in the groove of the plug of the rod 6a by maneuvering the displacement device 30, 32.

The position of the indicator 76 on the graduated rule 78 is noted.

For example, if a work operation is to be performed at the level of a lower joining piece, the indicator 77 indicating the position 0 on the dynamometric rule 78, a displacement of 10 mm of the indicator 76 for a force of 0 daN corresponds to an actual path of the pushing fork equal to 6.5 mm, as appears in FIG. 14.

It may be deduced therefrom that the fuel rod 6a is placed at 6.5 mm beyond its extreme lower position.

The fuel rod is then pushed and the pushing forces for obtaining a displacement of the rod are measured.

To this end, use is made of the control 90, disposed outside the casing 71, in order to rotate the threaded shaft 115 in the desired direction. A displacement of the nut 118 and of the support dish is thus produced, on the corresponding spring 127 (or 128). The spring is compressed between the washer and the corresponding support plate of the movable assembly 100 and produces a pushing force which corresponds to the pushing force exerted by the fork 64 on the rod 6a.

When the force exerted on the dynamometric spring is sufficient to overcome the axial retention force on the pencil in the assembly, the rod is displaced over a certain height so that the movable assembly 100 is capable of being displaced, which ensures decompression of the dynamometric spring. The displacement of the movable assembly 100 and of the pushing fork 6 is arrested due to the fact that the force exerted by the spring decreases during displacement of the movable assembly 100.

The operator 23, located at the control station 25, makes a certain number of readings, by directly reading the position of the indicators relative to the scales of the graduated rules fixed on the upper part of the casing 71.

He notes the force indicated by the indicator 77 on the rule 79 at the time when the rod begins to be displaced, i.e., the time when the indicator 76 leaves the position 0 on the graduated rule 78. This measurement of force in daN indicates the maximum value of the retention force on the rod.

When the inner movable assembly 100 has completed its displacement, the graduated rule 79, which is fixed on the sleeve 121 of this movable assembly has been displaced, so that the indicator 77 indicates the actual value of the axial retention force on the rod in daN.

The operator notes the values indicated by the indicators 76 and 77 on the graduated rules 78, 79, respectively.

The results obtained are then analyzed with the aid of charts, such as shown in FIGS. 13 and 14.

For example, in the case of a work operation performed from the lower joining piece of the assembly, the following values were noted:
- the indicator 77 indicates the value 20 daN on the dynamometric rule 79.
- the indicator 76 indicates the value of 18 mm on the rule 78 graduated in millimeters.

A displacement of the indicator 76 of 18 mm, under a load of 20 daN, corresponds to a displacement of the rod of 8 mm relative to its extreme lower position, as may be seen on the chart in FIG. 14.

If reference is made to the example described hereinabove, in which the initial position of the pushing fork 64 indicated a displacement of 6.5 mm of the rod relative to its extreme lower position, it may be deduced therefrom that the rod has been displaced in reality by $8 - 6.5 = 1.5$ mm, under a load of 20 daN.

Overall results obtained make it possible to determine the state of the framework of the fuel assembly in respect of, in particular, the retention springs of the fuel rods in the cells of the spacer grids.

The device thus makes it possible to ensure that the retention springs of the peripheral rods of the assembly correctly fulfill their function after several operating cycles.

The device according to the invention makes it possible to check the axial retention force on the peripheral pencils of the assembly without having to remove the lower and upper joining pieces, this operation being performed under several meters of water in the storage pool for the fuel.

Implementation of the device is relatively simple in that the assembly for displacement, adjustment and maneuvering of the device used may be positioned and controlled from the edge of the pool.

After each measurement, the rods which have been pushed may be re-placed in their initial position by using the remote control in the pulling direction, after having replaced a pushing tool fitted at the level of the joining piece opposite to that from which the initial pushing was performed. For this purpose, use could be made of two different pushing tools each associated to a carriage of a double crossed carriage device, one of the tools ensuring the initial pushing and the other tool the re-placement of the pencil from the opposite joining piece.

If the measurement results obtained reflect displacements of the rods of a significant length under a small load, it may be deduced therefrom that the springs are no longer fulfilling their function of axially retaining the rods. In this case, it is appropriate to refuel the fuel rods in a new framework enabling them to be correctly retained.

It is possible to use axial pushing devices and remote control means for these pushing devices for the rods which are produced in a form other than that which has been described.

The means for measurement of the axial pushing force on the pencil and of the length of displacement may be different from those which have been described and comprise, for example, displacement sensors and strain gauges.

Use may also be made, if appropriate, of the device according to the invention in order to check any inner row of rods of the assembly after removing the rods located on the outside of this inner row. It is then simply necessary to use a pushing fork of a length which is adapted in order to reach the rods which are at a distance from the periphery and even the rods located in the central part of the assembly from the time when these rods are accessible between the guide tubes of the assembly.

What is claimed is:

1. Device for checking the axial retention force on a peripheral rod (6a) of a fuel assembly (1) of a nuclear reactor inside the framework of the assembly, comprising a plurality of spacer grids (2) retaining the fuel rods in a uniform network in transverse direction and in the axial direction of the rod (6a) by virtue of gripping means (15, 16, 7) associated with the cells of the grid (2) in which the rods (6) are inserted, the checking being performed remotely and under a certain depth of water in a fuel assembly storage pool, by virtue of the device which comprises:
   (a) a rod (28) on which is mounted a means (30, 32, 33) for support and displacement which is movable in an axial direction of the rod (28) and in two directions perpendicular to said axial direction;
   (b) a device for pushing axially on a longitudinal end of the rod (6a) carried by the means (30, 32, 33) for support and displacement, consisting of a fork (64) comprising an end notch (66) for its engagement on a shoulder of an end plug of the rod, said fork being fixed on an element (61) which is movable in the vertical direction in a guide means (60) fixed on the means (30, 32, 33) for support and displacement, and of at least one support fork on a face of a corresponding end joining piece (4, 5) of the fuel assembly, which fork is fixed on the means (30, 32, 33) for support and displacement, the vertical displacement of the movable element being ensured by a remote control means (42, 45);
   (c) means (77, 79, 76, 78) for measuring the axial pushing force on the rod (6a) and the amplitude of the axial displacement of the rod under the effect of the pushing action, disposed at the upper level of the storage pool (27);
   (d) and at least one video camera (34) carried by the means (30, 32, 33) for support and displacement in order to provide an image of the zone in the vicinity of the end of the rod (6a) on which a pushing action is being exerted;
   wherein the movable element consists of a sliding shaft (61) on which is machined a rack (61') of vertical direction, the remote control means (42, 45) consisting of a ball remote control whose flexible movable element (45) is connected to the end of a rack (47) engaging with a drive pinion (52) driving the displacement of the rack (61') and of the movable element (61) by means of at least one pinion (56, 57).

2. Device according to claim 1, wherein the end of the ball remote control (42, 45) opposite to its end which is connected to the rack (47) comprises an end of a sheath (42) fixed on a casing (71) and an end of a flexible element (45) which is movable in the sheath (42) fixed on a carriage (108) mounted so as to move inside the casing (71), an indicator (76) for measurement of displacement being fixed on the carriage (108) so as to comprise a movable end inside an aperture (75) passing through the casing (71) along a graduated rule (78) fixed on the outer surface of the casing (71) the indicator (76) and the graduated rule (78) making it possible to measure the displacements of the carriage (108) and of the movable flexible element (45) of the ball remote control.

3. Device according to claim 2, comprising means for displacement of the carriage (108) inside the casing (71), said means consisting of a screw (106) on which is engaged an internally threaded nut (107) interacting with the carriage (108) for its displacement guided by at least one column (101) fixed in the casing (71).

4. Device according to claim 3, wherein the screw (106) is mounted so as to move in rotation on a movable assembly (100) inside the casing (71) in the axial direction of the screw (106).

5. Device according to claim 4, wherein the movable assembly (100) comprises a sleeve (121), two end plates (104, 124, 105, 125) and a displacement device consisting of a threaded shaft (115) parallel to the screw (106) mounted so as to move in rotation in the casing (71) disposed in the bore of the sleeve (121) and along its axial direction, on which is mounted a threaded nut (118) engaging with the screw thread of the shaft (115) inside the sleeve (121), two dynamometric springs (127, 128) each being inserted between a support dish (119, 120) of the nut (118) and an end plate (104, 124, 105, 125) of the movable assembly (100), the threaded shaft (115) comprising a profiled end part outside the casing (71) for rotation of the shaft in one direction or another and for the axial displacement of the nut (118) inside the sleeve (121) ensuring the compression of a dynamometric spring (127, 128) leading to a displacement of the movable assembly (100) for a certain compression force corresponding to the pushing force necessary to overcome the axial retention force on the rod (6a).

6. Device according to claim 5, wherein the nut (118) carries an indicator (77) which is capable of being displaced inside an aperture (130) passing through the wall of the sleeve (121) coinciding with an aperture (74) passing through the casing (71) along a graduated rule (79) carrying a graduation indicating the pushing force on the pencil which is a function of the position of the nut (118).

7. Device according to claim 6, wherein the movable element (100) is guided in its displacements inside the casing (71) by two columns (101, 101') parallel to the screw (106) and to the threaded shaft (115) on which the movable assembly (100) is mounted so as to slide by means of ball bushes (103, 103') fixed on the end flanges (104, 105).

* * * * *